H. GROGAN & G. T. LAPE.
DISTILLATION OF HYDROCARBON OILS.
No. 89,988. Patented May 11, 1869.
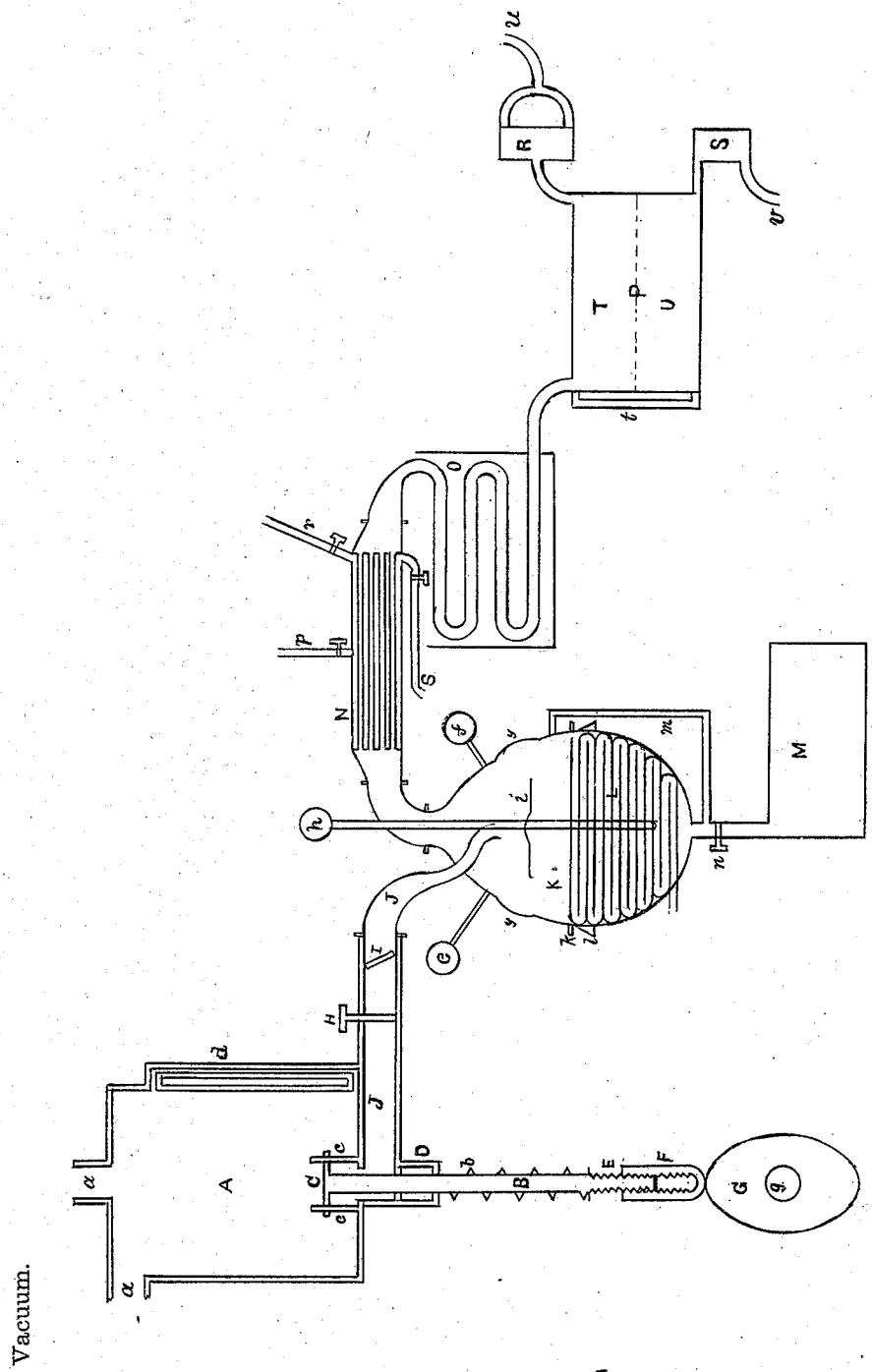

United States Patent Office.

HENRY GROGAN AND GEORGE T. LAPE, OF NEW YORK, N. Y.

Letters Patent No. 89,988, dated May 11, 1869.

IMPROVEMENT IN THE DISTILLATION OF HYDROCARBON-OILS.

The Schedule referred to in these Letters Patent and making part of the same.

*To all whom it may concern:*

Be it known that we, HENRY GROGAN and GEORGE T. LAPE, of the city and State of New York, have invented a new and useful Improvement in the Distillation of Hydrocarbon-Oils; and we do hereby declare that the following is a full and exact description thereof, which will enable those skilled in the art to practise the same, reference being had to the accompanying drawings, and to the letters of reference marked thereon, forming a part of this specification, in which— a is a supply-pipe.
A is a feed-tank.
d is its level-indicator.
C is its discharge-valve.
c are guide-rods to said valve.
B is the valve-rod.
b is a spiral spring on valve-rod.
D is a stuffing-box.
E is a screw on end of valve-rod.
F, an adjustable nut on said screw.
G is a cam, or eccentric, on crank-shaft of vacuum-pump.
g is the crank-shaft of vacuum-pump
J is the discharge-pipe of the feed-tank into the still.
H is its regulating, or stop-cock.
I is its check-valve.
K is a vacuum-still.
i is a sprinkler.
L is the evaporator.
k are flanges.
l are lugs.
m is a level-indicator.
n is the residuum discharge-pipe.
M, the residuum-receiver.
y are the eye-glasses.
e is a vacuum-gauge.
f is the pressure-gauge.
h is a pyrometer.
N is a hot-water condenser.
p, its exhaust-pipe.
r, its feed-pipe.
s, its discharge-pipe.
O is a cold-water condenser.
P is the distillate-receiver.
T is its vacuum.
U is its distillate.
V is its level-indicator.
R is a vacuum-pump.
u is its exhaust-pipe.
S is the distillate discharge-pump.
v, its discharge-pipe.

The great desideratum to be attained in the distillation of hydrocarbon-oils is to be able to carry on the process in such a manner as will result in obtaining from a given quantity of oil the greatest possible distillate free from discoloration.

In cases where a large quantity of the oil is placed in the still at the same time, and heat applied, the lighter vapors are first removed, and the heavier volatile products are only evolved as the temperature is increased, so that, progressively, the different properties are evolved, carried off, and separated in order, resulting in several different qualities of products and final discoloration, before all the available products are removed.

In cases, moreover, where a greater or less quantity of oil is first placed in a still, and heat applied till the distillate begins to flow from the worm, and then introducing, continuously, cold oils, by means of an inlet-pipe, discharging under the surface of the heated oils of the still, in such quantities that the supply shall not exceed the outflow from the worm, the still may be made to run a greater quantity of oil without interruption than in the other case, but with no material difference in its results.

When, in these cases, discoloration ensues, it is a common practice to let common steam into the still. The steam, producing an outward current through the condenser, brings over some of the remaining volatile products of the oil.

But, as it reduces the heat of the still, the volatile products soon cease to be evolved, and the distillation is brought to an end before all the available products of the oil are removed.

In order to effect a more thorough and rapid distillation, resulting in a more satisfactory distillate, which will combine a greater amount of, and, as nearly as practicable, all the distillable properties of the crude oils, is, therefore, the object of our invention, which consists—

First, in providing the still with a means of an alternate supply and exhaust, so that, when the still is heated, and kept heated to the required temperature to vaporize all the distillable products, or so much thereof as may be desired, a succession of charges of the cold oils may be admitted, each charge suddenly vaporized, and the evolved products of each charge successively removed.

Second, in making provisions for a gradual condensation of the evolved products, or so much thereof as may be desired.

Third, in producing a distillate which may have, in combination, as many of the different chemical properties resulting from the distillation as may be practicable, or as may be desired.

The arrangement and mode of operation are as follows:

A reservoir, or feed-tank, A, of any capacity desired, and supplied with oil from the main tank, or otherwise, through the tube a, is placed near the still, and connected with its interior by a pipe, J, through which the oil passes from the reservoir A into the still K. This pipe, at its junction with the reservoir A, is provided with a valve, C, which is affixed to a piston, or valve-rod, B. This rod extends to a cam, or eccentric, or elliptical wheel, G, which is secured to the crank-shaft of a vacuum-pump.

The pipe J is further provided with a packing-box,

D, through which the valve-rod passes; a stop, or regulating-cock, H, to prevent, or regulate the flow of oil from the receiver to the still, when required; a check-valve, I, to prevent any flow into the still while there are vapors in it; also, to prevent the vapors from passing out into the reservoir.

The end E of the valve-rod B is provided with a screw, and an adjustable nut, F, which permits the rod to be lengthened or shortened, as required, and the valve C to be lifted more or less, for a longer or shorter time, and thus admit a greater or less quantity of oil to the still, as may be desired.

A vacuum-still, K, composed of two main parts, bolted together through the flanges k, and supported upon its foundation by lugs, l, cast upon its sides, contains an evaporator, L, coils of pipe, or otherwise, through which superheated steam is passed to heat the still.

The still is provided with a level-indicator, m, to show the amount of residuum in it; also, the discharge-pipe n, to draw off the residuum into the residuum-receiver M, when desired. It is also provided with a vacuum-gauge, a pressure-gauge, and a pyrometer, indicating, respectively, the amount of vacuum in the still, the pressure of its vapors, and the degree of heat contained within it. It is further provided with a sprinkling, or dissipating-pan, i, placed beneath the supply-pipe J, for the purpose of scattering the charges of oil as they are admitted to the still.

To the neck of the still is attached a hot-water condenser, N, which may be of the form shown in the drawing, or any other of the known forms of condensers.

Through this condenser the evolved products first pass, and are partially cooled before entering the worm of the cold-water condenser O, where the temperature is so regulated that only such portions of the evolved products as will not remain vaporized at 110°, will be condensed on reaching the vacuum distillate-receiver, while those portions of the evolved products not condensing at 110°, are drawn from the vacuum distillate-receiver P by the vacuum-pump R, and exhausted, through its exhaust-pipe u, to wherever desired.

When required, the distillate is drawn from the distillate-receiver P by the discharge-pump S, through the discharge-pipe v, to wherever desired.

The process of working is as follows:

The feed-tank is supplied with the oils to be distilled, and heat applied to the still, until it has acquired a temperature which will evolve the available products, or so much of them as may be desired, of the quantity of oil to be admitted at each charge.

Now start the vacuum-pump, and open the stopcock H, to admit the oil to the still.

The stroke, or action of the vacuum-pump, and that of the valve-rod B, must be so regulated that the pump will withdraw from the still the evolved products of each charge of oil admitted, before the valve C shall be again raised to admit the next charge of oil to the still.

While we claim, that by the application of all the parts of our invention, the best results will be attained, it will be seen that we do not intend to limit ourselves to the whole combination, as a great improvement on all former modes is effected by merely admitting the crude oils to a still already heated to the necessary temperature to evolve the required products of each charge, and allowing the vapors to pass off and be condensed in the ordinary manner, in which case, of course, some provision must be made to regulate the admission of the cold oils to the still.

The distillate-receiver may be the ordinary open kind now in use, in which case, the vacuum-pump will be placed at any desired point between the still and the distillate-receiver, and the hot-water condenser may be dispensed with.

What we claim as our invention, and desire to secure by Letters Patent, is—

1. The application of cold hydrocarbon-oils to a heated still, in such quantities that the heat in the still will suddenly evolve their available products, or so much of them as may be desired, before admitting a subsequent supply.

2. Combining the means of supplying the oils to a still with a vacuum-pump, so as to have the supply of oils, and the exhaust of their evolved products, alternate, substantially as and for the purpose herein specified.

3. Regulating the time of admission, and the quantity of oils admitted into the still, to its temperature, so that the available products, or so much of them as it may be desired to evolve, may be evolved together, and immediately drawn off by the vacuum-pump, without materially affecting the temperature of the still, substantially as and for the purpose herein specified.

4. Conducting the evolved products, first, through a hot-water condenser, then a cold-water condenser, into a vacuum distillate-receiver, whence the lighter, or uncondensed vapors, remaining separated from the heavier, or condensed products, are removed by the vacuum-pump, substantially as and for the purpose herein specified.

5. The combination of the means of supply, with a vacuum-still, and a hot-water, and a cold-water condenser, and vacuum distillate-receiver, and a vacuum-pump, substantially as and for the purpose herein specified.

6. The combination of the means of supply, with a vacuum-still, and a hot-water, and a cold-water condenser, and a vacuum-pump, substantially as and for the purpose herein specified.

7. The combination of the means of supply, with a vacuum-still, and a cold-water condenser, and a vacuum-pump, substantially as and for the purpose herein specified.

8. The combination of a vacuum-still with a hot-water and a cold-water condenser, and a vacuum distillate-receiver, and a vacuum-pump, substantially as and for the purpose herein specified.

9. The combination of a vacuum-still with a hot-water and a cold-water condenser, and a vacuum-pump, substantially as and for the purpose herein specified.

HENRY GROGAN.
GEO. T. LAPE.

Witnesses:
THOMAS VAN ANTWERP,
DAN READ.